(12) United States Patent
Donahue (10) Patent No.: US 7,318,195 B2
(45) Date of Patent: Jan. 8, 2008

(54) SYSTEM AND METHOD FOR INTEGRATING TACTILE LANGUAGE WITH THE VISUAL ALPHANUMERIC CHARACTERS

(76) Inventor: Sean Donahue, 941 N. San Vicente Blvd., Suite 15, West Hollywood, CA (US) 90067

(*) Notice: Subject to any disclaimer, the term of this patent is extended or adjusted under 35 U.S.C. 154(b) by 647 days.

(21) Appl. No.: 10/638,130

(22) Filed: Aug. 8, 2003

(65) Prior Publication Data

US 2005/0032026 A1    Feb. 10, 2005

(51) Int. Cl.
*G06F 15/00* (2006.01)
*G06F 13/00* (2006.01)

(52) U.S. Cl. ........................ 715/702; 345/157
(58) Field of Classification Search ........ 715/702–707, 715/746, 840, 700; 345/161, 157
See application file for complete search history.

(56) References Cited

U.S. PATENT DOCUMENTS 6,542,623 B1 * 4/2003 Kahn ..................... 382/114
6,747,631 B1 * 6/2004 Sakamaki et al. .......... 345/157
7,097,457 B2 * 8/2006 Kajino et al. ............... 434/112

* cited by examiner

*Primary Examiner*—Cao (Kevin) Nguyen
(74) *Attorney, Agent, or Firm*—The Hecker Law Group, PLC (57) ABSTRACT

A mapping system that integrates tactile language (specifically level 1 Braille) with the visual alphanumeric alphabet. A unified tacto-visual form of communication and recording is created. Alphanumeric characters present simultaneous direct relationships between the individual alphanumeric elements and their tactile corollaries within a single form. Segments of each alphanumeric character are configured to meet at points of tactility. Tacto-visual characters comprised of two languages (i.e. Level 1 Braille and the visual alphanumeric character set) are created. Configurations of characters create a legible and readable simultaneous form of communication. The invention provides a tactile surface for blind readers to engage with a visual source for full vision readers and a hybrid for low vision readers. Tactile communication can occupy a same location as the alphanumeric visual communication thereby providing an interface for both the visually-impaired and the full-vision user.

40 Claims, 9 Drawing Sheets

| a | b | c | d | e | f | g | h | i | j |
|---|---|---|---|---|---|---|---|---|---|
| k | l | m | n | o | p | q | r | s | t |
| u | v | w | x | y | z | | | | |

Figure 1c

| Capital Sign | Number Sign | Period | Comma | Question Mark | Semi-colon | Exclamation point | Opening quote | Closing quote |
|---|---|---|---|---|---|---|---|---|

SYSTEM AND METHOD FOR INTEGRATING TACTILE LANGUAGE WITH THE VISUAL ALPHANUMERIC CHARACTERS

FIELD OF THE INVENTION

The invention relates to the field of computer software and is more particularly directed to a system and method for integrating tactile language with the visual alphanumeric alphabet.

BACKGROUND OF THE INVENTION

When a person is blind or has significantly impaired vision it is a struggle for that person to read and write. Braille, a system that uses a set of raised dots that correspond to the letters of an alphabet, is designed to alleviate this struggle by allowing people to read and write by touch. Braille is read by moving the hand or hands from left to right along each line. Both hands are generally involved in the reading process, and the reading itself is typically accomplished with the index fingers. On average people can read Braille about 125 words per minute, but greater speeds are possible if the person is well trained at reading this way.

Figure 1A:
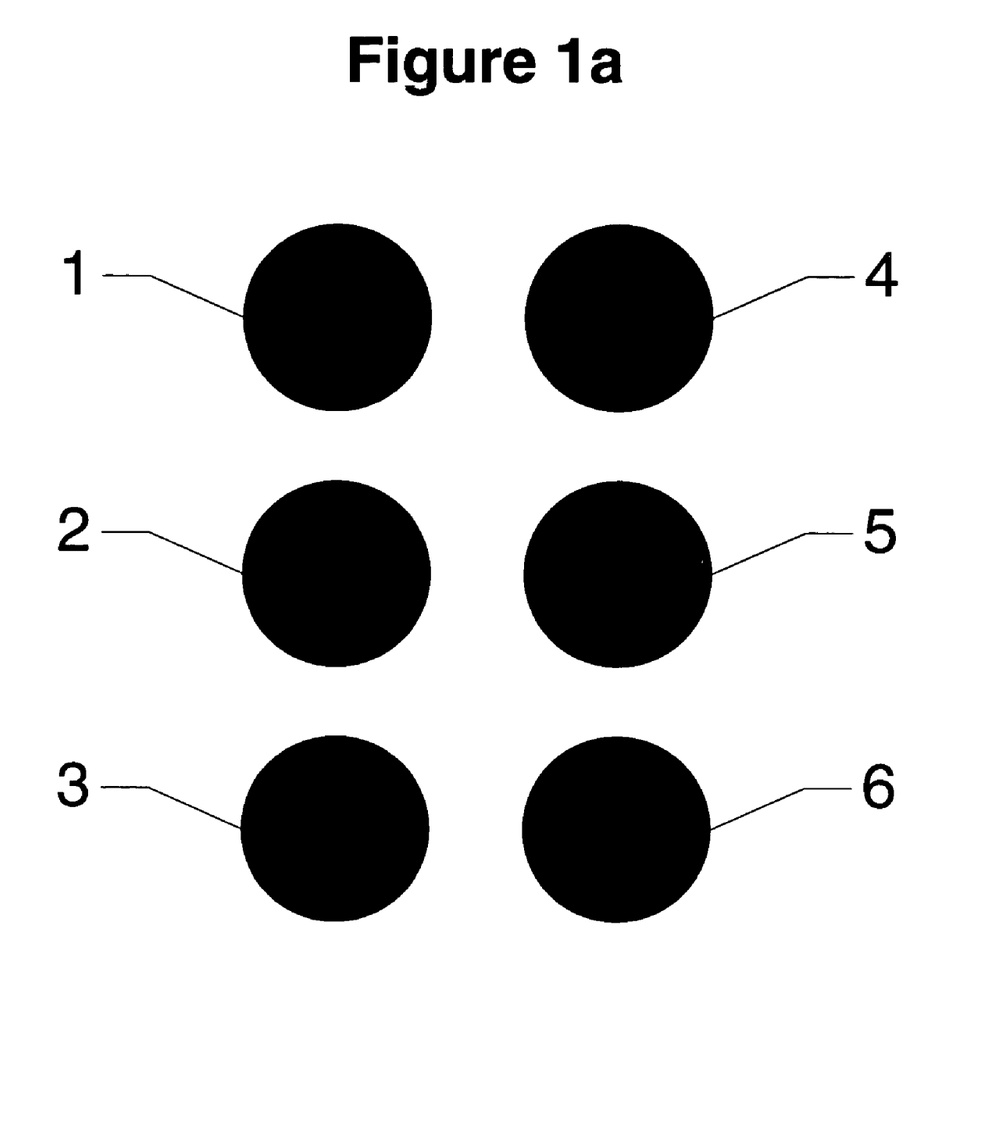
FIG. 1a illustrates how the six-dots of a Braille cell are arranged and numbered.

The entire Braille alphabet is based on a six-dot cell. As FIG. 1a illustrates, the six-dots of a Braille cell are arranged and numbered 1-6. In the simplest form of Braille (called grade 1) a certain arrangement of dots within each cell stands for one letter. The English alphabet a through z is represented in the manner depicted in FIG. 1b. Braille also contains equivalents for punctuation marks and provides symbols to show letter groupings (see e.g., FIG. 1c). A cell containing a single dot 6 is used before each letter that is to be capitalized. The number sign, dots 3, 4, 5, 6, placed before the characters a through j makes the number 1 through 0. For example, a preceded by the number sign is 1, b is 2, etc.

Various other methods had been attempted over the years to enable blind people to read, many of them raised versions of print letters. It is generally accepted that the Braille system has succeeded because it is based on a rational sequence of signs devised for the fingertips, rather than imitating signs devised for the eyes. In addition, Braille can be written by blind people and can be used for any notation that follows an accepted sequence, such as numerals, musical notes or chemical tables. Thus, Braille is widely regarded as the standard way to communicate with the visually impaired.

To make it easier for visually impaired persons to interact with a particular device the manufacturers of these devices sometimes provide a set of instructions for using the device written in Braille. For instance, in addition to containing a regular printed set of instructions, it is commonplace for Automated Teller Machines (ATM) to contain a separate set of Braille instructions along side the printed instructions. In addition, the keyboard of the ATM machine may contain tactile queues (e.g., a raised portion indicative of the center key or some other combination of keys). These tactile queues are designed to further assist the visually impaired user by providing an indication of proper hand placement. Other devices adapted to assist visually impaired users are similarly configured in that the primary interface of printed characters exists separate from the interface for the visually impaired.

Figure 1B:
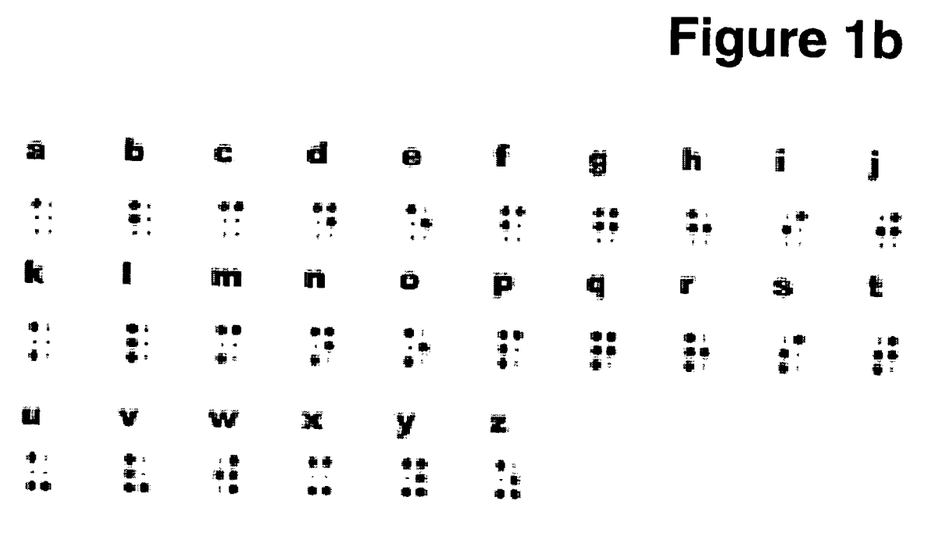
FIG. 1b illustrates how each Braille characters maps with a set of alphanumeric characters.
Figure 1C:
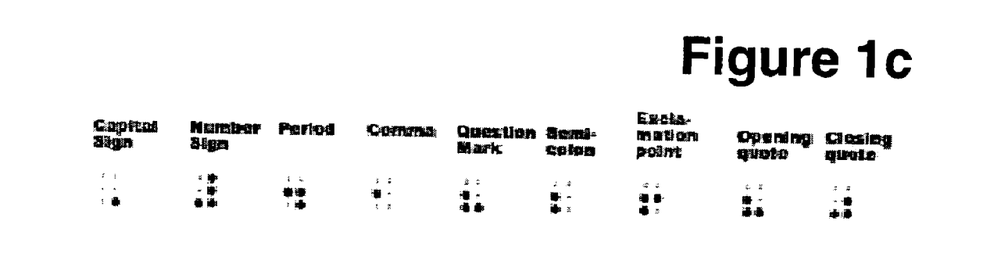
FIG. 1c illustrates how each Braille characters maps with a set of alphanumeric symbols.

A problem encountered when attempting to add a Braille interface to an interface containing a set of alphanumeric characters is that two interfaces are required. A Braille interface for the visually impaired and an alphanumeric interface for the non-visually impaired. As FIGS. 1b and 1c illustrate, these two interfaces do not cohesively mesh with one another. The alphanumeric characters do not consistently cover the dots used to represent the Braille characters. Thus, any interface that utilizes both systems appears busy and contains redundant information. Because of these and other limitations there is a need for a solution that solves the problem of duplicity by unifying the interface for the visually impaired with the interface for the non-visually impaired.

SUMMARY OF THE INVENTION

Embodiments of the invention are directed to a system and method for integrating tactile language with the visual alphanumeric alphabet the visually impaired. The invention comprises of a mapping system that integrates tactile language (e.g., level 1 Braille) with the visual alphanumeric alphabet. Creating a unified tacto-visual form of communication and recording. Configuring alphanumeric characters in order to present simultaneous direct relationships between the individual alphanumeric elements and their tactile corollaries with in a single form. Thus, the system comprises a set of alphanumeric characters where each character is configured to simultaneously represent a corresponding Braille character and thereby provides a mechanism that in one embodiment eliminates the need for redundant interfaces.

The segments of each alphanumeric character are configured to meet at points of tactility. Creating tacto-visual characters comprised of 2 languages (i.e. Level 1 Braille & the visual alphanumeric character set). The configurations of the characters create a legible and readable simultaneous form of communication. In doing so the invention provides a tactile surface for blind readers to engage with a visual source for full vision readers and a hybrid for low vision readers. By allow the tactile communication to occupy the same location as the alphanumeric visual communication it provides a certainty in how a blind individual engages a physical interface. Providing the ability to engage and learn interfaces that exact same way the visually impaired or full vision user would. Creating a 1 to 1 visual-tactile correlation it additionally provides those unfamiliarly or those unable to understand either of the forms of communication the ability to assist others in understanding what is being communicated.

There are various aspects and methodologies associated with implementing the system. For instance, in one embodiment of the invention a computer system is adapted to create and render and set of display elements that can be output as a character set. Creating a character set involves generating a set of display elements that visually map a set of Braille characters to a set of alphanumeric characters within a boundary region set by the alphanumeric characters themselves. Each display element typically utilizes a standard Braille cell as a non-visible underlayer for a set of alphanumeric characters adapted to overlay dots within the Braille cell. For instance, the character I, which is represented by dots in cells 2 and 3 is formed so that one or more portions of the dots are directly touching or visibly within the boundaries of the character I. Thus, the alphanumeric characters are adapted to overlay a set of Braille characters. In some instances the standard Braille character set may be modified to conform with a particular character's attributes. However, in the large majority of cases the alphanumeric character is shaped to cover the appropriate dots cell in a way that maintains the ability for the non-visually impaired to recognize the character while still conforming to the Braille character set. The invention contemplates the use of multiple variations of the character set where each variation is designed to cater to a specific audience. The alphanumeric portion may, for instance, be a different (e.g., inverted) color or shade from the Braille character. In other instances each of the characters may contain an additional display element such as a line or some other display graphic configured to accentuate the characters visibility.

Once these display elements are defined the computer system renders each element for display and outputs them to one or more systems in a manner that makes it optionally feasible to raise each of the dots for purposes of providing tactile feedback to the visually impaired. For instance, the computer system may utilize a special purpose printer configured to print the display elements as alphanumeric characters having raised dots. Thus, characters adapted in conformance with the invention enable a visually impaired person to understand the meaning of each character by feel while simultaneously conveying the same information to a person who is not visually impaired.

DETAILED DESCRIPTION

A system and method for integrating tactile language with the visual alphanumeric alphabet is described herein. In the following description numerous specific details are set forth in order to provide a more thorough understanding of embodiments of the invention. It will be apparent, however, to an artisan of ordinary skill that the present invention may be practiced without incorporating all aspects of the specific details described herein. In other instances, well-known features have not been described in detail so as not to obscure the invention.

Embodiments of the invention described herein are directed to an article of manufacture and methods relating to producing that article of manufacture. To generate character elements a computer readable memory medium, computer program product, or computer system is programmed to obtain a set of display elements and output those elements as a character.

Figure 2A:
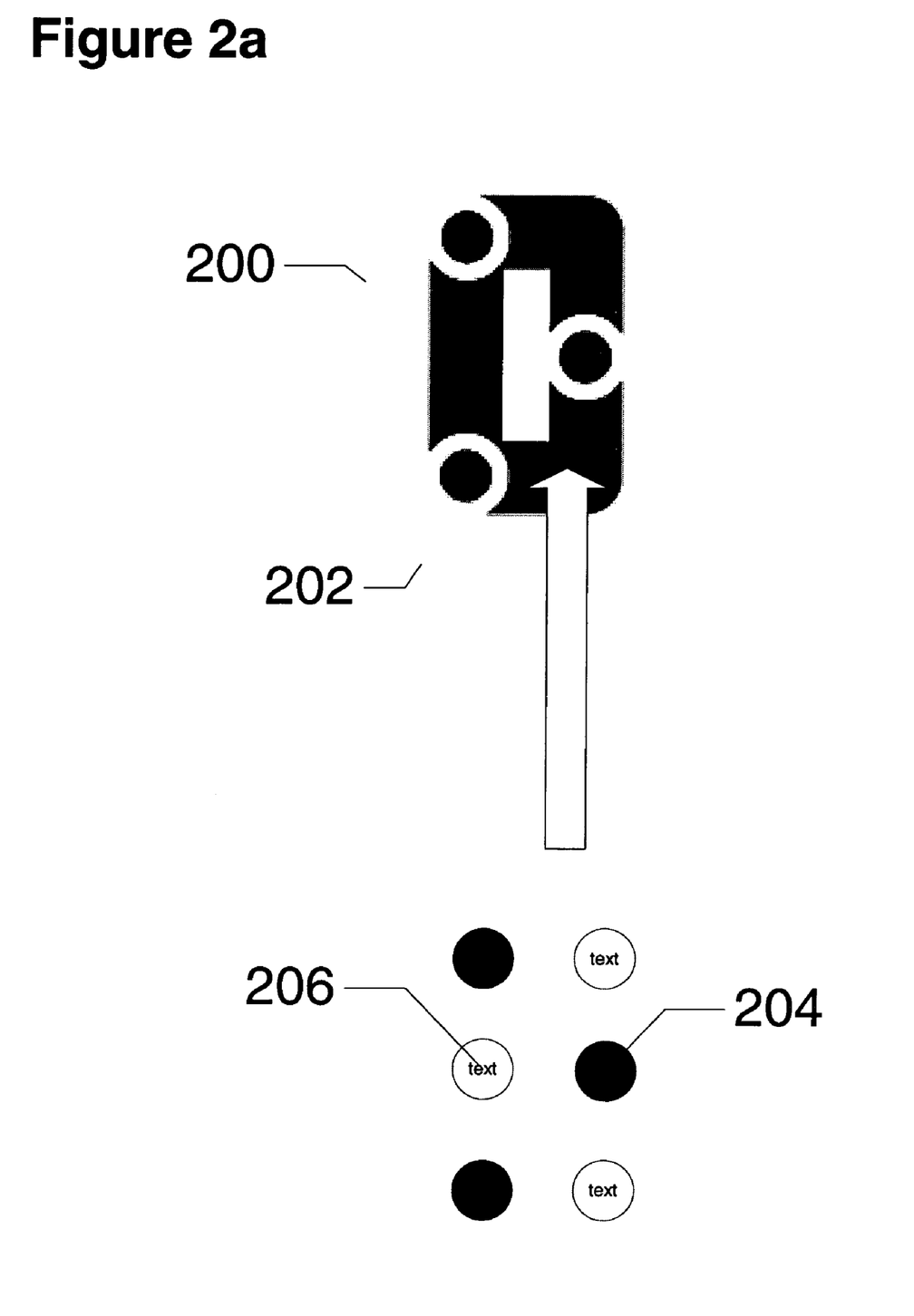
FIG. 2a depicts an example character embodying one or more aspects of the invention.

FIG. 2a depicts an example character embodying one or more aspects of the invention. The character is typically manufactured using a computer system configured to obtain a display element that represents an alphanumeric character. Referring to FIG. 2a, for instance, the letter O is shown as a display element (200) that defines an approximate boundary (202) for another display element. The lower section of FIG. 2a depicts an example of the other display element (e.g., a second display element (204)). This second display element (204) may take any geometric shape, but is typically shaped in the form of a Braille dot.

The placement of each of the second display elements (204) depends upon which of the six subregions (206) (e.g., a six-dot cell utilized in Braille) is to contain a visible second display element (204). Readers should note that other cell or table arrangements e.g., less than six or more than six cells are also contemplated by the invention. The invention does not require that each of the elements be made visible at the same time. The second display elements made visible are typically determined by the alphanumeric character those display elements represent. In the example illustrated, display elements positioned in cells 1, 3, and 5 are visible for purposes of indicating the letter those elements are to be overlayed with is the letter O.

The exact position of each second display element may vary depending upon the boundary region (202) defined by the first display element. In some instance boundary region (202) is larger than display element (200) whereas in other instances boundary region (202) is the same or approximately the same size as display element (200) (see e.g., FIG. 2a). The distance between boundary region (202) and display element (200) depends upon which alphanumeric character or symbol display element (200) represents. In the example shown in FIG. 2a which utilizes the letter O the outside edge of display element (200) represents the boundary region. However, in the example depicted in FIG. 2b utilizing the letter I boundary region (202) falls beyond the precise edge of display element (200) but still takes the same generalized shape.

Figure 2B:
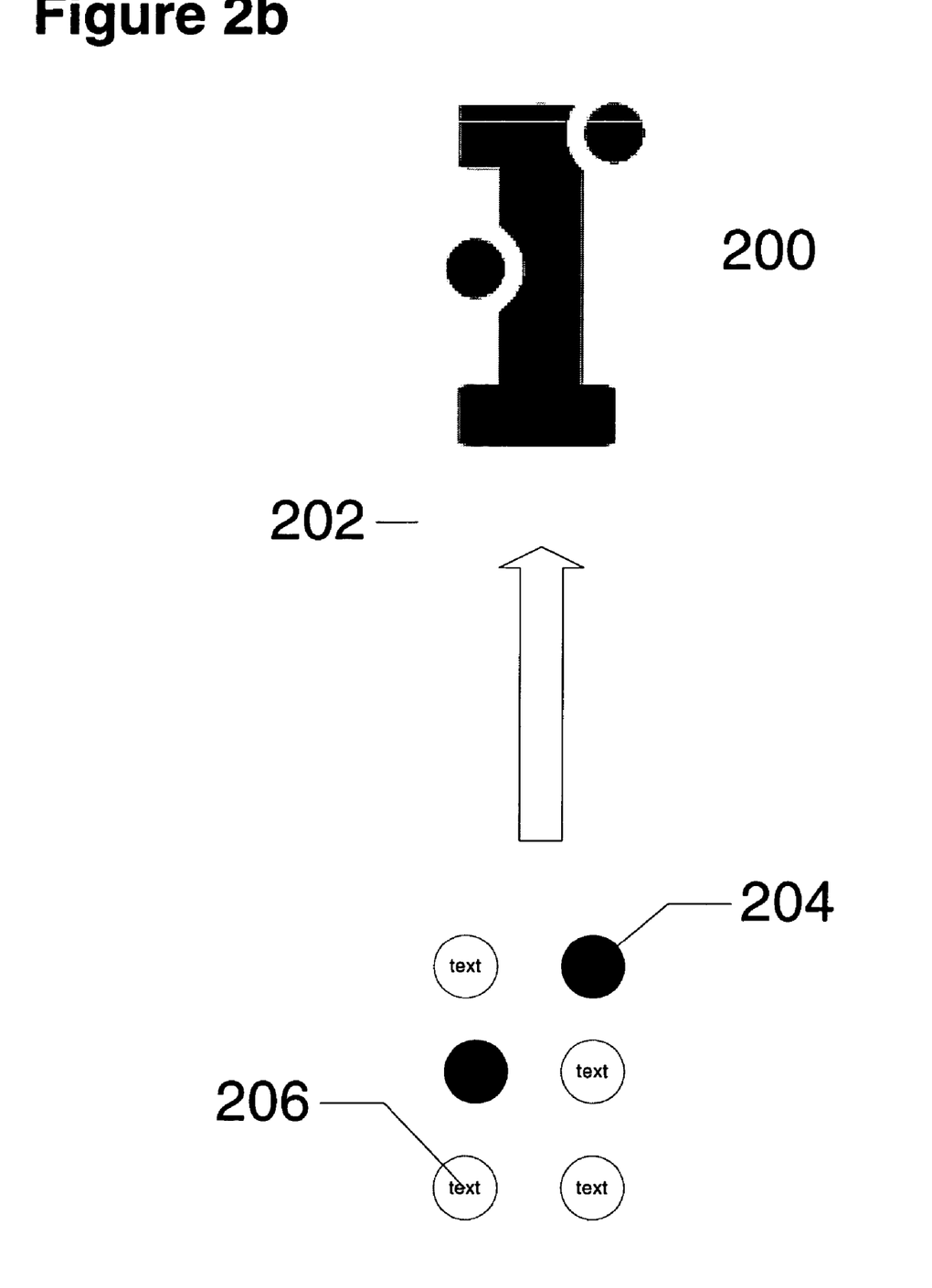
FIG. 2b depicts an example character embodying one or more aspects of the invention.

Regardless of what shape boundary region (202) is (and any shape is possible), systems configured in accordance with one or more embodiments of the invention are capable of rendering the second display element substantially within that boundary region. The term substantially as used in this context means that in some instances a portion of the second display element may fall on or outside boundary region (202) so long as at least the remaining portion of display element falls within boundary region (202). Thus, display the second display elements may touch the border of boundary region (202).

Once the appropriate display elements are combined or other wise rendered whether that process be completed manually by a user or automatically with the memory of a computer system, the system utilizes that information to output a character set that visually represents the display element. The output may take several forms and in some instances contains the second display element is adapted to provided tactile feedback to visually impaired persons. For instance, if the output is paper or some other tangible medium the region of the character comprising the second display element may be raised or recessed to enable visually impaired persons to distinguish its characteristics.

Figure 3A:
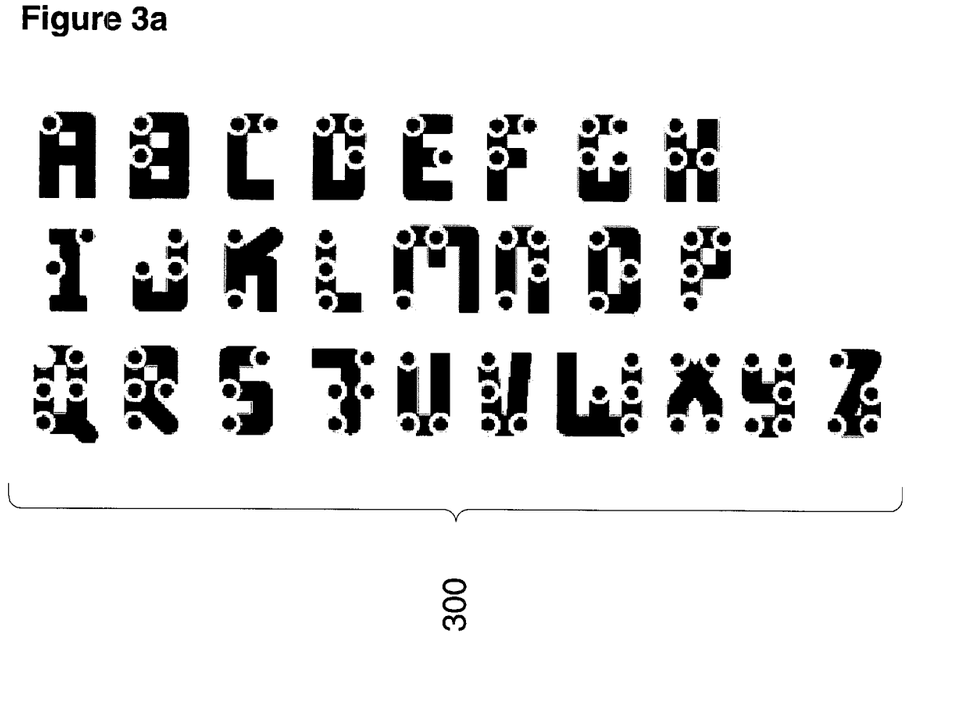
FIG. 3a illustrates a set of example characters configured in accordance with an embodiment of the invention.
Figure 3B:
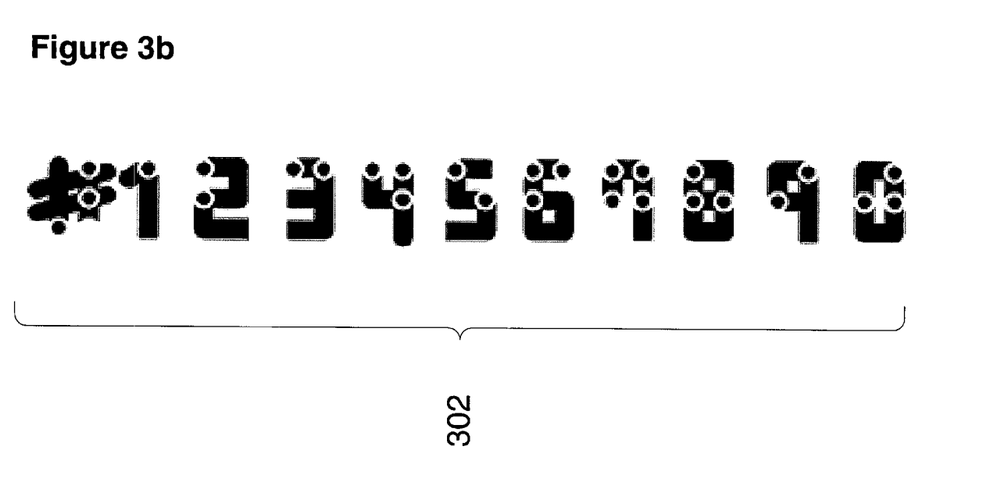
FIG. 3b illustrates a set of example symbols configured in accordance with an embodiment of the invention.

Each of the display elements may be the same or a different color. Instances where the second display element is visually unified with the first display element (e.g., as a function of each element being the same or a similar color) are particularly well-suited for people who are blind. However, people that have any vision at all, even if that vision is extremely low vision, may be able to read the Braille aspects of the second element when a least a portion of the second element is a color that contrasts well with the base color of the first element (see e.g., FIGS. 3a and 3b which illustrates a set of characters A-Z (300) and a sample set of corresponding symbols (302)). Black and white, for instance, provides the best contrast, but other color combinations are also contemplated as falling within the scope of the invention. Another benefit of using visually distinct color combinations is that when given a set of characters, people with vision can use it as a tool for learning or teaching Braille.

Figure 4A:
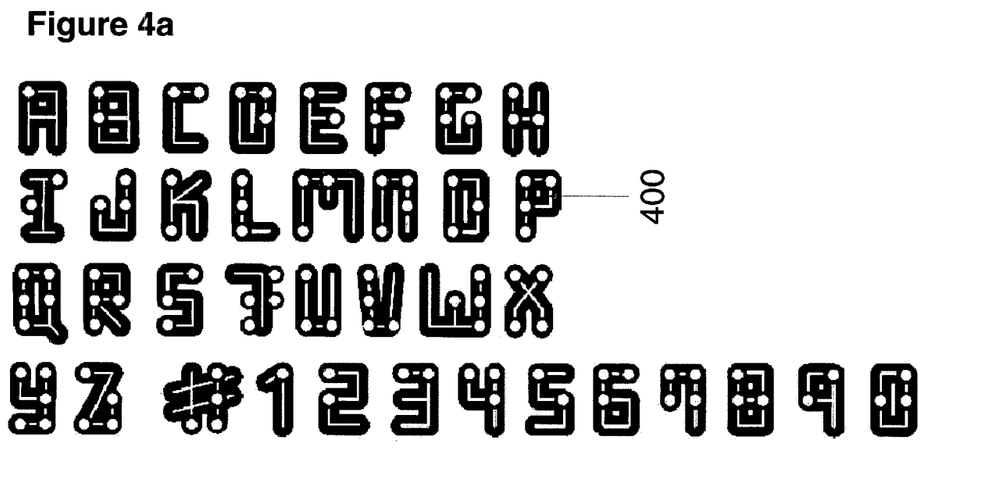
FIG. 4a illustrates a set of example characters and symbols containing an optional third display element.
Figure 4B:
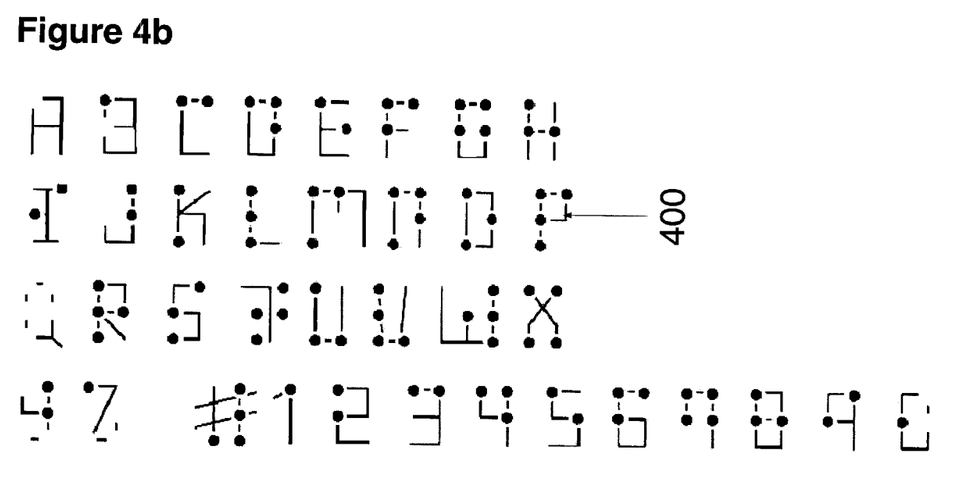
FIG. 4b illustrates a set of example characters and symbols containing an optional third display element, but without the first display element.

Characters configured in accordance with one or more embodiments of the invention may also comprise a third display element that is visually associated with the second display element and/or proximate to that display element. For instance, as FIG. 4a illustrates when third display element (400) is a line, it is not required to be coupled with the second display element. However, readers should note that it is well within the scope of the present invention for the line to visually connect with the second display element. The line could also be dashed or take another shape altogether. Embodiments utilizing a third display element are helpful for people that have minimal vision capabilities, but can see well enough to distinguish certain shapes. FIG. 4b illustrates an embodiment of the invention where the first display element is not made visible or is not present. Thus, each character A-Z and a corresponding set of symbols comprises the second and third display elements (400).

In one embodiment of the invention the computer system is configured to render characters within a graphical user interface where the characters can be further manipulated by a user. In such instances the computer system is configured to render the first display element(s) that as was discussed above, represent a set of alphanumeric characters that define a boundary region for the second display element which is positioned within the boundary region and typically contains a plurality of visible dots positioned in a six dot-cell. The characters rendered within the interface may optionally contain a third display element that also falls within the boundary region and comprises a line positioned between the plurality of visible dots.

Figure 5:
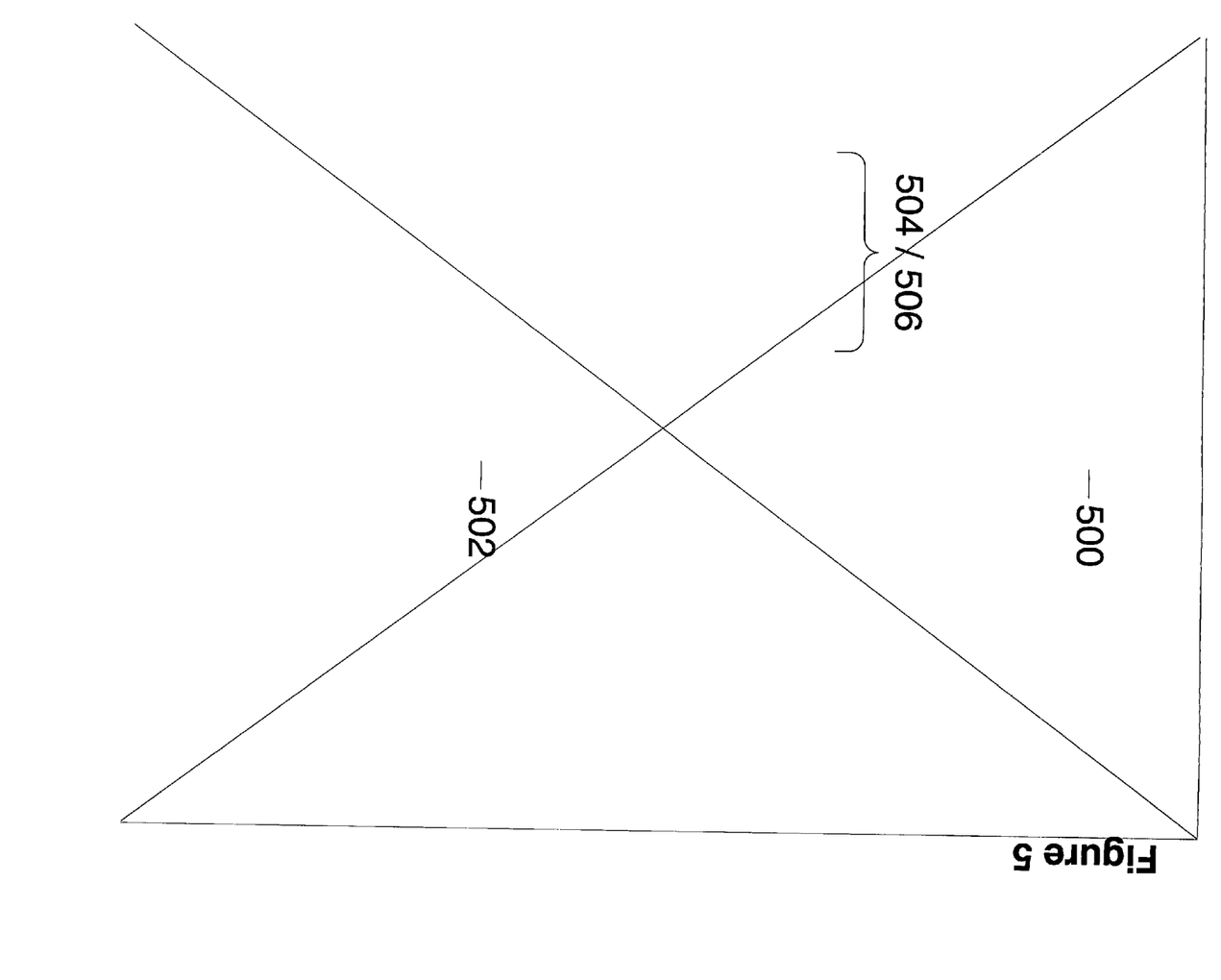
FIG. 5 illustrates an example ATM interface adopted to utilize embodiments of the invention.

FIG. 5 shows an example ATM interface adopted to utilize embodiments of the invention. Characters generated and output using the technique described here are utilized throughout the interface. The ENTER (500), CANCEL (502), numbers 1, 2, 3, 4, 5, 6, 7, 8, 9, 0, (504) and any needed symbols (506) for operating the ATM machine (or any other device) can be adapted utilizing the invention described herein to cater to people with vision and people who are vision impaired in a single interface. It is not necessary to have separate interfaces for Braille and the regular alphanumeric characters. Thus, as is illustrated in the ATM example (but by no means limited to any specific type of device), embodiments of the invention may be utilized in an interface for obtaining command data. Such interfaces may contain a set of characters that upon selection input commands or other input information to the device for processing (e.g., by a CPU or other hardware/software). The characters may be placed on or near the buttons (e.g., keyboards) or other input mechanism used to operate the device. These characters typically comprise at least one alphanumeric character that defines a boundary region for a Braille element such as a second display element. The Braille element is positioned within said boundary region and may comprises a plurality of visible dots positioned in a six dot-cell. As was discussed above, these Braille elements may vary in color and have a raised portion for purposes of providing tactical feedback to the operator of the device. The characters may also contain a third display element as discussed above.

This invention further establishes a method by which interfaces are able to provide use through tactile and/or visual queues. Allowing the sighted the opportunity to navigate an interface tactilly with the exclusive use of their digits while simultaneously executing or engaging in secondary or primary visual activities or requirements outside or other then the interface. The invention creates a navigational system that provides the visual reinforcements necessary for those with vision to learn and utilize tactile marks (of the visual corollaries) in order to more securely allow the user to engage in the requirements associated with multitasking. This same method additionally provides the interface with the inclusive navigational resources necessary for those with low or no-vision the ability to engage and operate the exact same interface.

Readers should note that although the letters A-Z and a set of corresponding symbols was used herein for purposes of example, the invention has applicability to other character sets and may be adapted for use with other languages and Braille type systems for communicating information to the visually impaired.

Thus, a system and method for rendering alphanumeric characters to provide tactile feedback to the visually impaired has been described. The claims however, and the full scope of any equivalents are what define the metes and bounds of the invention.

What is claimed is:

1. An article of manufacture comprising:
   computer readable program code executing in a memory medium, said computer readable program code configured to:
   obtain a first display element representative of an alphanumeric character that defines a boundary region for a second display element;
   obtain a second display element and render said second display element substantially within said boundary region, where said second display element comprises a visual representation of at least one dot from a multi-dot Braille cell; and
   display a character set that visually represents said first display element and said second display element.

2. The article of manufacture of claim 1 wherein said second display element comprises at least one geometric shape.

3. The article of manufacture of claim 2 wherein said at least one geometric shape is adapted to provide tactile feedback to visually impaired persons.

4. The article of manufacture of claim 2 wherein said at least one geometric shape comprises a Braille dot.

5. The article of manufacture of claim 1 wherein said first display element has a first color and said second display element comprises a second color.

6. The article of manufacture of claim 1 wherein said second display element comprises six sub-regions.

7. The article of manufacture of claim 6 where at least one of said six sub-regions is made visible within said boundary region.

8. The article of manufacture of claim 6 wherein said six sub-regions regions comprise a six-dot Braille cell.

9. The article of manufacture of claim 1 wherein said first display element and said second display element are visually unified.

10. The article of manufacture of claim 1 where said second display element is visually associated with a third display element.

11. The article of manufacture of claim 10 wherein said third display element is proximate to said second display element.

12. The article of manufacture of claim 11 wherein said third display element is connected with said second display element.

13. The article of manufacture of claim 10 where said third display element comprises a line.

14. The article of manufacture of claim 1 wherein said first display element and said second display element are visually distinct.

15. In a computer system, a method comprising:
   generating a first display element comprising a visual representation of an alphanumeric character where said first display element defines a boundary region for a second display element;
   generating said second display element within said boundary region where said second display element comprises a visual representation of at least one dot from a six-dot Braille cell; and
   displaying said first and said second display element as a character on display screen.

16. The method of claim 15 wherein said second display element takes a geometric shape.

17. The method of claim 16 wherein said geometric shape is adapted to provide tactile feedback to visually impaired persons.

18. The method of claim 16 wherein said at least one geometric shape comprises a Braille dot.

19. The method of claim 15 wherein said first display element has a first color and said second display element comprises a second color.

20. The method of claim 15 wherein said second display element comprises six sub-regions.

21. The method of claim 20 where at least one of said six sub-regions is made visible within said boundary region.

22. The method of claim 20 where said six sub-regions comprise a six-dot Braille cell.

23. The method of claim 15 wherein said first display element and said second display element are visually unified.

24. The method of claim 15 wherein said first display element and said second display element are visually distinct.

25. The method of claim 15 wherein said second display element is visually associated with a third display element.

26. The method of claim 25 wherein said third display element is proximate to said second display element.

27. The method of claim 25 wherein said third display element is connected with said second display element.

28. The method of claim 25 where said third display element comprises a line.

29. The method of claim 15 further comprising:
   outputting said character to a tangible medium.

30. The method of claim 29 wherein said outputting said character to said tangible medium comprises printing said character.

31. The method of claim 29 wherein said outputting said character to said tangible medium comprises:
   modifying said tangible medium to provide tactile feedback associated with said second display element.

32. The method of claim 15 wherein said second display element comprises a raised portion.

33. The method of claim 15 wherein said second display element comprises a recessed portion.

34. A computer program product comprising:
   computer readable program code executing in a memory medium, said computer readable program code configured to render characters within a graphical user interface, said characters comprising:
   a first display element representative of an alphanumeric character that defines a boundary region for a second display element;
   a second display element positioned within said boundary region and comprising a plurality of visible dots positioned in a six-dot cell;
   a third display element positioned within said boundary region where said third display element comprises a line positioned between said plurality of visible dots.

35. An apparatus comprising:
   an interface for obtaining command data, said interface comprising a set of characters that upon selection input said command data;
   said set of characters comprising at least one alphanumeric character that defines a boundary region for a Braille element, where said Braille element is positioned within said boundary region and comprises a plurality of visible dots positioned in a six-dot cell.

36. The apparatus of claim 35 wherein said alphanumeric character is a first color and said Braille element is a second color.

37. The apparatus of claim 35 wherein said Braille element is raised to provide tactile feedback.

38. The apparatus of claim 35 where said set of characters further comprises a third element positioned within said boundary region where said third display element comprises a line positioned between said plurality of visible dots.

39. The apparatus of claim 35 wherein said set of characters within said interface are associated with command input buttons.

40. The apparatus of claim 39 wherein said command input buttons is a keyboard.

* * * * *